United States Patent
Oroskar et al.

(10) Patent No.: US 9,629,041 B1
(45) Date of Patent: Apr. 18, 2017

(54) SUBSTITUTION OF SYSTEM PARAMETER INFORMATION FROM OTHER BASE STATION IN RESPONSE TO ERROR CONDITION

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 14/497,818

(22) Filed: Sep. 26, 2014

(51) Int. Cl.
 *H04W 4/00* (2009.01)
 *H04W 36/00* (2009.01)
(52) U.S. Cl.
 CPC ... *H04W 36/0083* (2013.01); *H04W 36/0022* (2013.01)
(58) Field of Classification Search
 CPC ............ H04W 36/0083; H04W 36/0022
 USPC .......... 370/331, 332, 252–254; 455/436
 See application file for complete search history.

(56) References Cited

U.S. PATENT DOCUMENTS

| | | | |
|---|---|---|---|
| 8,107,969 B2 | 1/2012 | Wu et al. | |
| 8,270,431 B2 | 9/2012 | Brisebois et al. | |
| 8,285,281 B2 | 10/2012 | Flore et al. | |
| 8,289,925 B2 | 10/2012 | Ore et al. | |
| 2005/0148368 A1 | 7/2005 | Scheinert et al. | |
| 2012/0028661 A1 | 2/2012 | Fang et al. | |
| 2012/0176901 A1* | 7/2012 | Fang | H04W 36/22 370/235 |
| 2013/0084864 A1* | 4/2013 | Agrawal | H04W 36/0083 455/436 |
| 2014/0051449 A1* | 2/2014 | Yerrabommanahalli | H04W 36/30 455/437 |
| 2014/0087727 A1 | 3/2014 | Walton | |
| 2015/0016312 A1* | 1/2015 | Li | H04W 74/0833 370/280 |
| 2015/0358940 A1* | 12/2015 | Zhang | H04W 4/06 370/312 |

\* cited by examiner

*Primary Examiner* — Chuong T Ho

(57) ABSTRACT

Disclosed is a method and system to help rectify errors in operation of a wireless communication system. When a base station detects one or more errors in operation of the system, the base station will automatically request and receive from an adjacent base station a set of one or more operational parameters that the adjacent base station is set to provide, and the base station will substitute the received operational parameters for those that the base station is set to provide to UEs. This process may thereby help to avoid recurrence of certain errors in operation of the system.

17 Claims, 4 Drawing Sheets

SUBSTITUTION OF SYSTEM PARAMETER INFORMATION FROM OTHER BASE STATION IN RESPONSE TO ERROR CONDITION

BACKGROUND

A typical wireless communication system include one or more base stations, each radiating to define one or more coverage areas, such as cells and cell sectors, in which user equipment devices (UEs) such as cell phones, tablet computers, tracking devices, embedded wireless modules, and other wirelessly equipped communication devices, can operate. Further, each base station of the system may then be coupled or communicatively linked with network infrastructure such as a switch or gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system (e.g., powers on in coverage of the system), the UE may detect a reference signal and read system information broadcast from a base station and may engage in a process to register itself to be served by the base station and generally by the system. For instance, the UE may transmit an attach message on an uplink control channel to the base station, and the base station and/or supporting infrastructure may then responsively authenticate and authorize the UE for service, establish a record indicating where in the system the UE is operating, establish local profile or context records for the UE, and provide an attach accept message to the UE. Thereafter, the UE may then be served by the system in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may have particular traffic channel resources assigned by the RAN, which the UE may use to engage in communication of bearer traffic and the like.

When a UE is served in a particular base station coverage area, the UE may also regularly monitor the reference signal strength in that coverage area and in other coverage areas of the system, in an effort to ensure that the UE operates in the best (e.g., strongest) coverage area. If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may report signal strengths to its serving base station when certain thresholds are met, and the base station and/or supporting infrastructure may work to hand the UE over to another coverage area.

In addition, some wireless communication systems may encompass multiple separate but interconnected networks, such as one network that provides high speed data communications and a separate "fallback" network that provides traditional telephony service. An example of this is a hybrid system that include an LTE network for data communications and a CDMA network (or GSM network or the like) for legacy telephone service and provides "circuit-switched fallback" (CSFB) service. With such an arrangement, a UE may be programmed to scan for and attach with the LTE network by default and to then register with the CDMA network by signaling through the LTE network. In particular, after the UE attaches with an LTE base station, the UE may then transmit to the LTE base station a CDMA registration message, and that registration message may pass through the LTE network to the CDMA network, leading to "pre-registration" of the UE with the CDMA network. Thereafter, when the UE has a voice call to place or the CDMA network has a voice call to connect to the UE, call setup signaling may similarly pass between the UE and the CDMA network via the LTE network, at which point the UE may then conveniently switch over to be served by a CDMA base station and to engage in the call.

Overview

In practice, a base station may provide served UEs with certain operational parameters useable by the UEs to facilitate operation in the wireless communication system. By way of example, and without limitation, such operational parameters could include parameters related to handover between coverage areas, and parameters related to CSFB operation. Numerous other examples may exist as well.

In terms of handover parameters, for instance, a base station may transmit to its served UEs a list of handover thresholds that the UEs should use as a basis to determine when to provide measurement reports and/or to engage in handover. Such handover thresholds may include, for instance, various signal strength thresholds defining particular handover-related events, such as:

"S-measure": Serving cell signal strength threshold below which the UE begins evaluating other handover thresholds A2 event: Serving cell signal strength becomes worse than a threshold, to trigger handover A3 event: Neighbor cell signal strength becomes more than a threshold delta higher than serving cell signal strength, to trigger handover A4 event: Neighbor cell signal strength becomes more than a threshold delta higher than a threshold, to trigger handover A5 event: Serving cell signal strength becomes lower than one threshold, and neighbor cell signal strength becomes higher than another threshold, to trigger handover.

Other handover thresholds may be specified as well.

As another example, to facilitate CSFB operation as discussed above, an LTE base station may transmit to its served UEs information about nearby CDMA coverage, such as a reference-cell identifier of a CDMA base station to which UEs can transition to engage in a voice call. When a UE transmits its CDMA registration request via the LTE network to the CDMA network, the UE may then include such specified information in its registration message, so that the CDMA network can treat the UE's pre-registration as being analogous to the UE having registered directly via that CDMA base station.

A wireless service provider may configure the base stations of such a system to provide UEs with operational parameters such as these. For example, engineers may manually program the base stations with data specifying the operational parameters and with logic to cause the base stations to transmit the operational parameters to served UEs, and/or an automated provisioning system may program base stations with such data and logic. In practice, the operational parameters may vary from base station to base station for various reasons. For instance, CSFB parameters may differ based on which CDMA base stations are nearby.

Each base station may then provide the operational parameters to served UEs in various ways. For example, a base station may be set to provide certain operational parameters to served UEs in a broadcast message, such as a system parameter message or system information block that the base station broadcasts generally for served UEs to receive. And as another example, a base station may be set to provide certain operational parameters to served UEs in control messages specifically to the individual UEs, such as in radio-resource control messages for instance.

Unfortunately, however, for various reasons, the operational parameters that a base station is programmed to provide to its served UEs may be incorrect. Such errors could be a result of human error during provisioning of base stations with operational parameters and/or as a result of system error in more automatically provisioning base stations with operational parameters. As UEs make use of such incorrect operational parameters, the result may then be various errors in operation of the wireless communication system, which may then lead to poor user experience.

By way of example, considering the handover thresholds described above, the "s-measure" value for the serving cell should normally be a higher signal strength than the various "A" thresholds for the serving cell, so that once the UE detects the "s-measure" being met, the UE could then wait until the serving cell signal strength becomes so low that it meets a particular specified "A" threshold, at which point the UE may then provide a measurement report to trigger handover. Through data entry error or for other reasons, however, a base station may be provisioned with incorrect handover thresholds, such as an erroneous "s-measure" threshold that is lower than all of the "A" thresholds for instance, and the base station may thus provide such incorrect handover parameters to served UEs. In that case, it is then possible that UEs served by the base station would not detect the "s-measure" threshold being met until the signal strength for the cell has already dropped below the various "A" threshold levels where handover should have been triggered. Consequently, as their signal strength will have dropped below the "A" threshold levels, those UE may abruptly lose their connections, which users may perceive as dropped or stalled communications.

Further, considering the CSFB process described above, a base station may be provisioned with incorrect parameters regarding the fallback network to which UEs may transition to engage in a voice call, which may result in failure of CSFB pre-registration of UEs served by the base station. For instance, an LTE base station may be provisioned with the wrong reference-cell identifier for a nearby CDMA base station and/or other CSFB-related parameter. As UEs attach with the LTE base station and then transmit via the LTE network to the CDMA network a registration request carrying that incorrect reference-cell identifier and/or other parameter, the CDMA network may then deny the registrations (e.g., on grounds that the indicated reference-cell is not associated with the CDMA network element (e.g., switch) that receives the registration request). These failed registrations may then prevent the UEs from engaging in CSFB calls and/or may force the UEs to leave LTE service altogether so as to instead register and operate directly via CDMA.

Disclosed herein is a method and system to help rectify errors in operation of a wireless communication system. In accordance with the disclosure, when a base station detects one or more errors in operation of the system, the base station will automatically request and receive from an adjacent base station a set of one or more operational parameters that the adjacent base station is set to provide, and the base station will substitute the received operational parameters for those that the base station is set to provide to UEs. Although this process is not guaranteed to avoid recurrence of the system error detected by the base station, the process may help to avoid certain errors moving forward, particularly if errors were a result of the base station having one or more incorrect operational parameters and if the substitute operational parameters from the adjacent base station are correct.

For example, with the handover threshold problem described above, the base station may detect that served UEs have been experiencing abrupt loss of connectivity, as an example of a system error. In response to detecting such a system error, the base station may then programmatically engage in signaling with an adjacent base station to request and receive a copy of the handover thresholds that the adjacent base station is set to provide to served UEs, and the base station may automatically substitute those received handover thresholds for those that it was set to provide to served UEs. In this manner, if the handover thresholds that the base station had been set to provide to served UEs were incorrect (even if the base station did not detect that fact) and if the handover thresholds that the base station received from the adjacent base station are correct, the process may help to prevent further lost connections resulting from incorrect handover thresholds.

As another example, with the CSFB parameter problem described above, the base station may detect that served UEs have been experiencing failed CSFB registration (e.g., as indicated by signaling from the fallback network with which CSFB registrations were attempted). In response to detecting such a system error, the base station may then programmatically engage in signaling with an adjacent base station to request and receive a copy of various CSFB operational parameters that the adjacent base station is set to provide to served UEs, and the base station may automatically substitute those received CSFB operational parameters for those that it was set to provide to served UEs. In this manner, if the CSFB operational parameters that the base station had been set to provide to served UEs were incorrect (even if the base station did not detect that fact) and if the CSFB operational parameters that the base station received from the adjacent base station are correct and applicable for the base station, the process may help to prevent further failed CSFB registrations.

Accordingly, in one respect, disclosed is a method operable in a wireless communication system comprising a first base station configured to serve UEs over an air interface and configured to provide to the UEs a first set of operational parameters useable by the UEs to facilitate operation of the UEs in the wireless communication system. In accordance with the method, the first base station detects one or more errors in operation of the wireless communication system, and the first base station responds by automatically (i) requesting and receiving, from an adjacent second base station, a second set of operational parameters maintained by the second base station, and (ii) substituting the second set of operational parameters for the first set of operational parameters, so that the first base station is then configured to provide to the UEs served by the first base station the second set of operational parameters rather than the first set of operational parameters.

In another respect, the disclosed method may involve the first base station periodically broadcasting, on the air interface, a system parameter message that specifies first system parameter information useable by the UEs to facilitate engaging in wireless communication service. Further, the method may involve the wireless communication system detecting an error condition experienced by one or more of the UEs served by the first base station, and, responsive to the detecting, automatically obtaining, from a second base station, second system parameter information different than the first system parameter information. The method may then involve the first base station substituting the received second system parameter information for the first system parameter information in the periodically broadcast system parameter message. That way, the system parameter message thereafter periodically broadcast by the first base station would then specify the second system parameter information instead of the first system parameter information.

Still further, in another respect, disclosed is a base station including a wireless communication interface through which to engage in communication with UEs served by the base station, a backhaul communication interface through which to engage in communication with various network entities, and a controller for carrying out various operations to help address system errors. In accordance with the disclosure, the operations include providing via the wireless communication interface, to UEs served by the base station, a set of operational parameters useable by UEs served by the base station to facilitate operation in a wireless communication system. Further, the operations include determining occurrence of one or more errors in operation of the wireless communication system, and in response automatically (i) requesting and receiving via the backhaul communication interface from an adjacent base station a copy of operational parameters maintained by the adjacent base station, and (ii) substituting the received operational parameters for the set of operational parameters that the controller provides to UEs served by the base station, so that the controller thereafter instead provides to UEs served by the base station the received operational parameters to facilitate operation in the wireless communication system.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
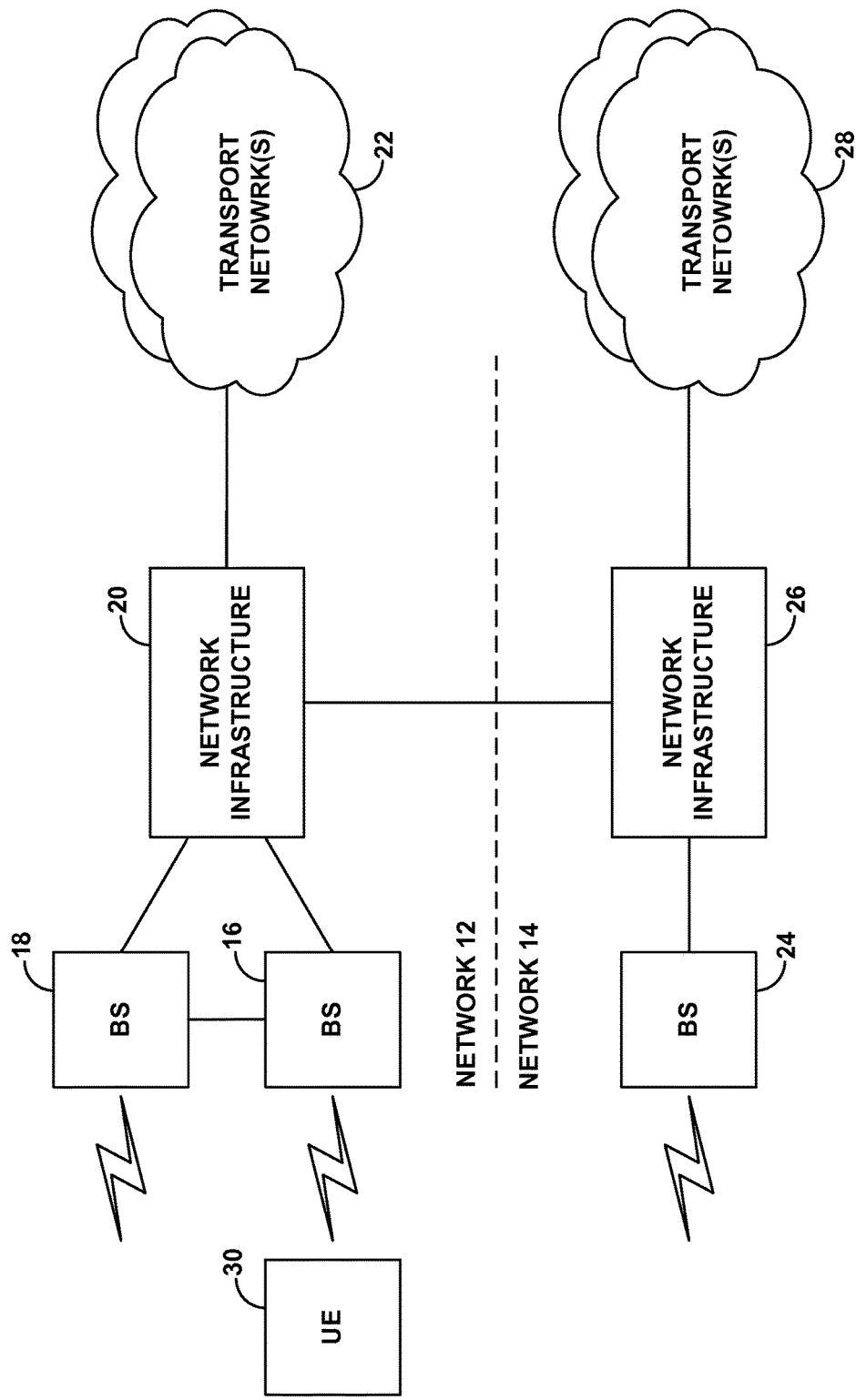
FIG. 1 is a simplified block diagram of a network arrangement in which aspects of the present disclosure can be implemented.

Referring to the drawings, as noted above, FIG. 1 is a simplified block diagram of an example wireless communication system in which features of the present disclosure can be implemented. It should be understood that this and other arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

The system of FIG. 1 includes two example networks 12, 14, which could be different types of radio access networks or could be the same type of networks, and which may be interconnected with each other in various ways. Network 12 is shown including two example base stations 16 and 18, both coupled with network infrastructure 20 (e.g., one or more switches and/or gateways) that provides connectivity with one or more transport networks 22 such as the PSTN and/or a packet-switched network such as the Internet. Network 14 is then shown including a representative base station 24, which we can assume is nearby or provides coverage co-located with either or both of base stations 16 and 18, and which is coupled with network infrastructure 26 (e.g., one or more switched and/or gateways) that similarly provides connectivity with one or more transport networks 28.

As a specific example, without limitation, the wireless communication system of FIG. 1 could be a hybrid system in which network 12 is an LTE network and network 14 is a fallback network such as an enhanced high rate packet data (eHRPD) network (e.g., a 1×EV-DO CDMA network). In that arrangement, base stations 16 and 18 may each be an "evolved Node-B" (eNodeB), and network infrastructure 20 may include a mobility management entity (MME), a serving gateway (SGW), and a packet data network gateway (PGW) providing connectivity with a packet-switched network. Base station 24 may then be a base transceiver station (BTS), and network infrastructure 26 may include a base station controller (BSC) or radio network controller (RNC), and a mobile switching center (MSC) providing connectivity with the PSTN and a packet data serving node (PDSN) providing connectivity with a packet-switched network. Further, an interworking server (IWS) could provide connectivity between network infrastructure 20 and network infrastructure 26, to facilitate exchange of signaling messages (such as CSFB registration messages, etc.) between the networks.

In line with the discussion above, each of these base stations may be configured to serve UEs, such as representative UEs 30, over an air interface that defines various channels of communication between the UEs and the base station. Further, each base station may be configured to provide its served UEs with operational parameters useable by the UEs to facilitate their operation in the wireless communication system. By way of example, a base station could be configured to periodically broadcast one or more system parameter messages that specify various operational parameters such as handover thresholds, access parameters, CSFB parameters, and/or other parameters as appropriate for the system at issue, and the served UEs may be configured to read such broadcast message(s) so as to then operate in accordance with the specified operational parameters. Alternatively or additionally, a base station could be configured to transmit some or all of the operational parameters to UEs on an as needed basis, such as when assisting with setup of a communication with or for the UE for instance.

As discussed above, the operational parameters could include handover threshold such as those listed above, so that served UEs can determine when to begin scanning for possible handover and when to provide measurement reports to trigger handover for instance. In practice, for instance, a UE being served by base station 16 might receive such handover thresholds in a broadcast message or control signal from base station 16 and may apply the handover thresholds so as to determine when to begin scanning for other coverage and to determine when to provide a measurement report to base station 16 to trigger handover. As the UE is moving out of coverage of base station 16 and into coverage of another base station, the UE may thus properly provide a measurement report that triggers handover. However, if the handover thresholds provided by base station 16 are wrong, the UE may not properly scan for handover and/or may not properly provide a measurement report, so the UE may lose connectivity, which base station 16 may detect and record as a loss of communication with the UE.

Alternatively or additionally, the operational parameters could include CSFB operational parameters. For instance, if network 12 is an LTE network and network 14 is a fallback network such as a CDMA network, base station 16 could broadcast periodically in an LTE "system information block #8" (SIB8) message information about the fallback network, including parameters such as a reference-cell identifier of coverage provided by base station 24. Once a UE attaches with (registers with) base station 16 and thus with the LTE network, the UE may then transmit a CSFB registration message via the LTE network to the network infrastructure 26 (e.g., to an interworking server and switch) of the fallback network to pre-register with the fallback network, so that the UE can then seamlessly move over later to engage in a call via the fallback network. As noted above, the UE may include in its CSFB registration message certain information that base station 16 provides as one or more of the CSFB operational parameters, such as the reference-cell identifier for instance. However, if that information is erroneous, such as if the information specifies an incorrect reference-cell identifier that is not associated with the network infrastructure 26 (e.g., switch), the network infrastructure 26 may refuse the requested registration, and thus the UE's CSFB registration would fail.

In some CSFB implementations, the LTE base station serving the UE at issue would not learn about the UE's failed CSFB registration. But some other systems might provide some way for the LTE base station to learn of the failure. For instance, upon rejection of a CSFB registration request, the network infrastructure 26 of the fallback network could responsively transmit a failure-notification or associated response to the network infrastructure 20 of the LTE network, which could in turn pass the failure-notification or indication of the failure notification to the base station 16.

In line with the discussion above, a base station in accordance with the present disclosure may detect one or more errors in operation of the wireless communication system, such as but not limited to abrupt loss of connections with one or more served UEs and/or one or more instances of CSFB registration failure. In practice, the base station may or may not detect what the specific error is or errors are but may receive, perhaps from one or more other entities such as UEs and/or network infrastructure, notifications of operational errors having occurred. Thus, the act of detecting the occurrence of one or more errors in operation of the wireless communication system could involve detecting specific errors having occurred, detecting occurrence of errors as a general matter, and the detecting process could involve evaluating operational records to identify errors in operation and/or being notified that errors occurred.

In accordance with the present disclosure, when a base station detects such error(s) in operation of the wireless communication system, the base station may then responsively obtain from another base station (perhaps an adjacent base station as listed in a neighbor list) a specification of one or more operational parameters that the other base station is set to provide to its served UEs, and the base station may substitute the received operational parameters for those that it was set to provide, so that the base station will become configured to provide the substitute operational parameters moving forward.

In the arrangement of FIG. 1, for instance, base station 16 may detect one or more errors in operation of the wireless communication system, such as a predefined threshold number of instances, or trend, of UEs losing connectivity without normal handover and/or of UEs experiencing CSFB registration failure. In response to detecting such error(s), regardless of whether the base station determines the root cause of the errors, the base station may then make an effort to help avoid recurrence of the errors moving forward, by obtaining and substituting one or more operational parameters from adjacent base station 18.

To facilitate obtaining operational parameters from another base station such as base station 18, base station 16 may programmatically refer to a neighbor list that specifies base stations neighboring base station 16 (e.g., a neighbor list that is useable to facilitate UE handover) and/or base station 16 may query network infrastructure 20 to find out what base station is nearby, and thus to select a base station from which to request substitute operational parameters. Base station 16 may then transmit a request to the other base station via an inter-base station communication interface (e.g., an X2 interface) or could transmit a request to another entity for forwarding in turn to the other base station. And the other base station may then respond with a message that provides data representing the operational parameters. Upon receipt by base station 16 of that data, base station 16 may then substitute the indicated operational parameters for those that it was set to provide to UEs, so that base station 16 would thus become configured to provide to UEs the substitute operational parameters instead.

In practice, the base station may have its operational parameters stored in data storage, from which the base station may provide the parameters to served UEs, and so substituting other operational parameters could involve storing the other operational parameters in place of the base station's existing operational parameters in data storage. Alternatively or additionally, the substitution could involve modifying program logic to be implemented by the base station so that the base station would then provide the substitute operational parameters instead of the operational parameters that it was previously set to provide.

Through this process, base station 16 may thus automatically obtain from base station 18 a set of operational parameters, which could include handover thresholds and/or CSFB operational parameters, and reconfigure itself to use those substitute parameters. In the event base station had erroneous operational parameters, and the substitute parameters are correct, this process may thereby help avoid recurrence of certain operational problems such as those noted above.

Note also that some of the functions described herein as being carried out by a base station could be carried out by one or more other entities on behalf of the base station or otherwise by one or more other components of the wireless communication system. For instance, detecting operational problems in the wireless communication system could be done by network infrastructure 20 based on records of operation in the system, and network infrastructure 20 could then notify base station 16 of the problems, which could amount to the base station detecting the problems by being notified of the problems. Further, obtaining and substituting operational parameters could likewise be done by the network infrastructure, providing the substitute operational parameters to base station 16 with a directive for base station 16 to make use of the parameters (e.g., set itself to provide the parameters to served UEs) moving forward, and base station 16 could then substitute the parameters accordingly. Other examples are possible as well.

Figure 2:
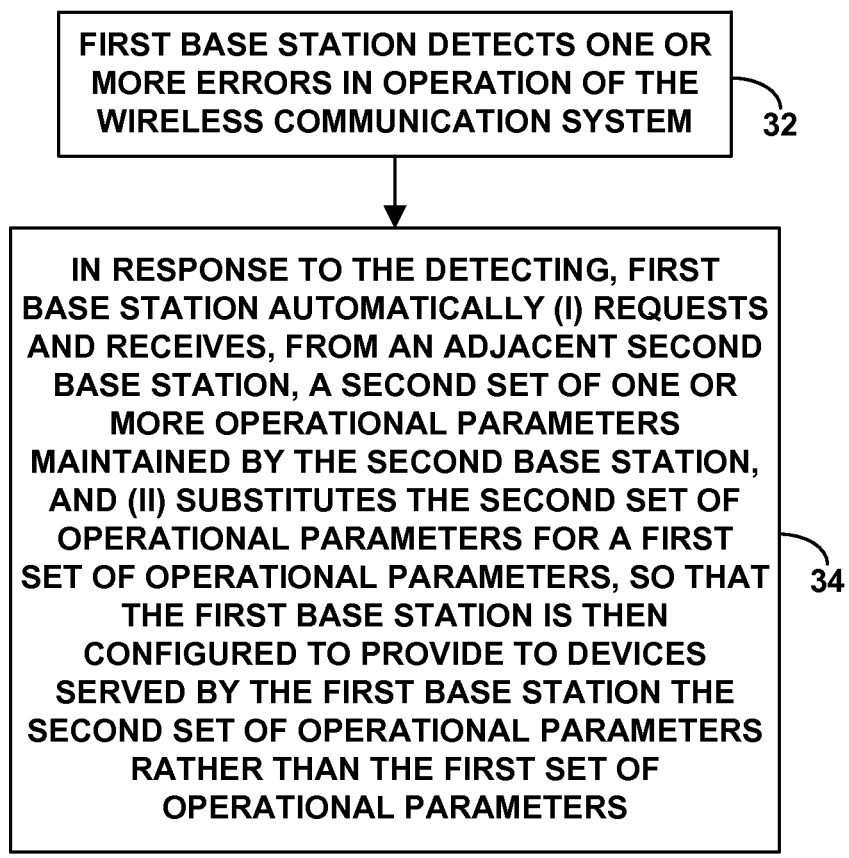
FIG. 2 is a flow chart depicting functions that can be carried out in accordance with the present disclosure.

FIG. 2 is next a flow chart depicting operations of a first base station such as base station 16 in line with the discussion above, which would be configured to serve UEs over an air interface and to provide to the UEs a first set of one or more operational parameters useable by the UEs to facilitate operation of the UEs in the wireless communication system. As shown in FIG. 2, at block 32, the first base station detects one or more errors in operation of the wireless communication system. And at block 34, in response to the detecting, the first base station automatically (i) requests and receives, from an adjacent second base station, a second set of one or more operational parameters maintained by the second base station, and (ii) substitutes the second set of operational parameters for the first set of operational parameters, so that the first base station is then configured to provide to the UEs served by the first base station the second set of operational parameters rather than the first set of operational parameters.

In line with the discussion above, the first base station an LTE eNodeB of an LTE network, the LTE network could be interconnected with a fallback network, and the first set of operational parameters could comprise information for UEs served by the eNodeB to include in fallback-registration messages that the UEs transmit via the LTE network to the fallback network, such as a set of SIB8 information (e.g., including a first reference-cell identifier). In that case, the one or more errors could comprise one or more instances of failed fallback-registration via the first base station, and the second set of operational parameters could then comprise a variation of the information to include in fallback-registration messages, such as different SIB8 information (e.g., including a second, different reference-cell identifier). For instance, there may be a difference in parameters, such as in reference-cell identifier information for example.

Alternatively or additionally, the first set of operational parameters could comprise handover thresholds useable by UEs to manage handover as discussed above, and the second set of operational parameters could comprise a variation of at least one of the handover thresholds useable by the UEs to manage handover. For instance, the second set could include a different "s-measure" parameter and/or different "A" thresholds. Still further, the operational parameters could take other forms as well, such as access parameters and/or other parameters that help to facilitate operation in the wireless communication system.

Figure 3:
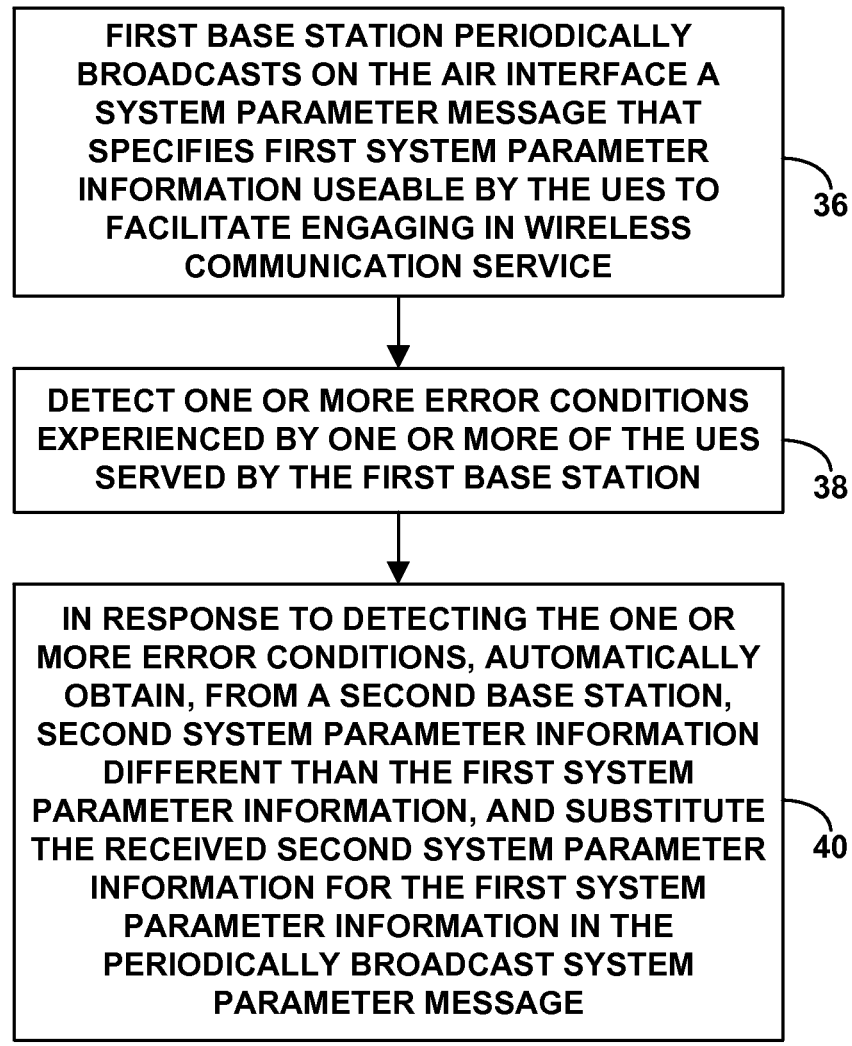
FIG. 3 is another flow chart depicting functions that can be carried out in accordance with the present disclosure.

FIG. 3 is next another flow chart depicting operations of a method that can be carried out in a wireless communication system in line with the discussion above, where a first base station is configured to serve UEs over an air interface. As shown in FIG. 3, at block 36, a first base station periodically broadcasts on the air interface a system parameter message (e.g., SIB8 message) that specifies first system parameter information useable by the UEs to facilitate engaging in wireless communication service. At block 38, the wireless communication system (e.g., the first base station) detects one or more error conditions experienced by one or more of the UEs served by the first base station. At block 40, in response to detecting the one or more error conditions, the method then involves automatically obtaining, from a second base station, second system parameter information different than the first system parameter information, and the first base station substituting the received second system parameter information for the first system parameter information in the periodically broadcast system parameter message. Through this process, the system parameter message thereafter periodically broadcast by the first base station will then specify the second system parameter information instead of the first system parameter information, which may help to avoid a recurrence of the one or more error conditions.

Again here, the first base station could be an LTE eNodeB of an LTE network, the LTE network could be interconnected with a fallback network, the system parameter message could be a SIB8 message, the first system parameter information could comprise information (e.g., a reference-cell identifier) for UEs served by the eNodeB to include in fallback-registration messages that the UEs transmit via the LTE network to the fallback network, the one or more error conditions could comprise one or more instances of failed fallback-registration via the eNodeB, and the second system parameter information could comprise a variation of the information to include in the fallback-registration messages (e.g., a different reference-cell identifier).

And again, alternatively or additionally, the first system parameter information could comprise handover thresholds useable by UEs to manage handover, and the second system parameter information could comprise a variation of at least one of the handover thresholds, and/or the system parameter information could take still other forms.

In line with the discussion above, the first base station may have the first system parameter information stored in data storage, in which case the act of automatically obtaining and substituting the second system parameter information could involve (i) the first base station requesting system parameter information from the second base station, via an inter-base-station interface, (ii) responsive to the requesting, the first base station receiving the second system parameter information from the second base station via the inter-base-station interface, and (iii) the first base station storing the received second system parameter information in place of the first system parameter information.

Figure 4:
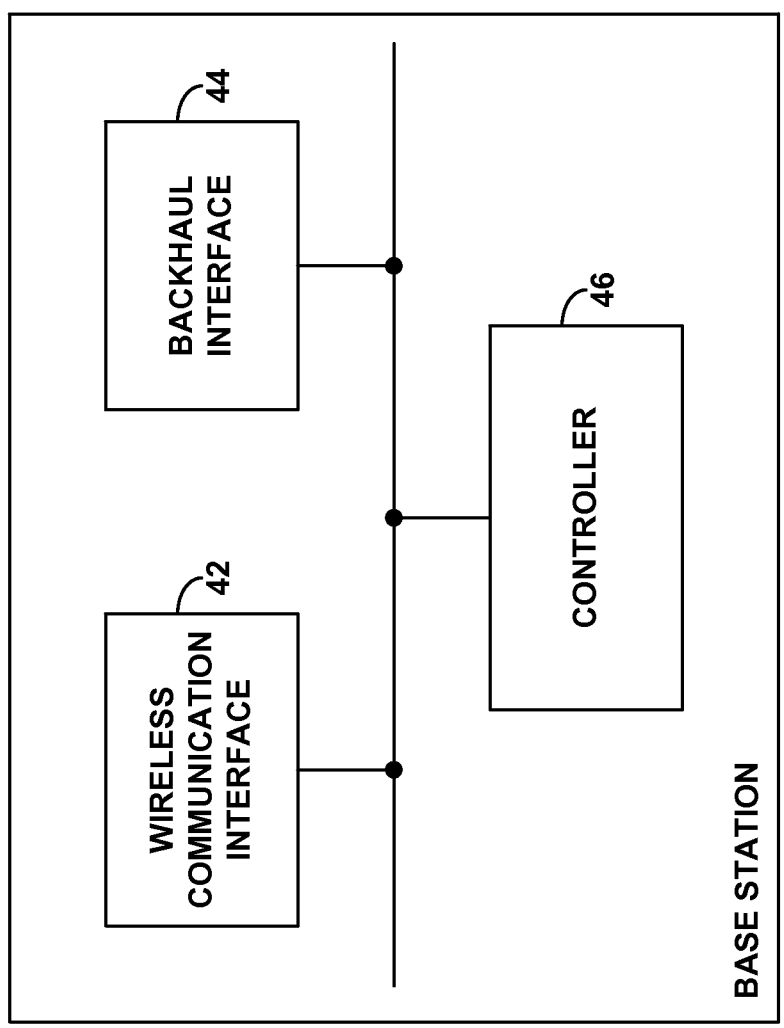
FIG. 4 is a simplified block diagram of a base station operable in accordance with the disclosure.

Finally, FIG. 4 is a simplified block diagram of an example base station, such as base station 16 discussed above for instance. This base station could take various forms, such as a macro base station of the type that typically includes an antenna tower and provides a broad range of coverage, or a small cell (e.g., femtocell) or relay, which typically has a much smaller form factor and provides a smaller range of coverage. As shown, the example base station includes a wireless communication interface 42 through which to engage in communication with UEs served by the base station, a backhaul communication interface 44 through which to engage in communication with other base stations and with various network infrastructure, and a controller 44 configured to cause the base station to carry out various base station operations described herein.

In practice, the wireless communication interface 42 may include a transceiver configured to serve UEs in accordance with one or more air interface protocols such as those noted above, along with a power amplifier and antenna structure that radiates to provide for air interface communication between the base station and served UEs. The backhaul wireless communication interface 44 may then comprise a wired or wireless network communication module, such as an Ethernet interface, through which the base station can communicate with other entities.

The controller 46 may also take various forms, including various combinations of hardware, firmware, and software for instance. By way of example, the controller could comprise one or more general purpose processors (e.g., microprocessors) and/or one or more special purpose processors (e.g., application specific integrated circuits), and one or more non-transitory data storage elements (e.g., magnetic, optical, and/or flash storage). The data storage could then hold program instructions executable by the processor(s) to carry out various base station functions described herein, and could further hold various reference data, such as the operational parameters and neighbor list data described above for instance.

In an example implementation, the controller 46 may thus be arranged to (a) provide via the wireless communication interface to UE served by the base station a set of operational parameters useable by the UEs to facilitate operation in the wireless communication system, (b) determine occurrence of one or more errors in operation of a wireless communication system (such as by being informed of one or more such errors, and/or by itself detecting one or more such errors), and (c) responsive to the determining, automatically (i) request and receive via the backhaul communication interface from an adjacent base station a copy of operational parameters maintained by the adjacent base station, and (ii) substitute the received operational parameters for the set of operational parameters that the controller provides to UEs served by the base station, so that the controller thereafter instead provides to UEs served by the base station the received operational parameters to facilitate operation in the wireless communication system.

Here again, the operational parameters could take various forms. For instance, they could include a reference cell identifier for circuit-switched fallback, handover thresholds useable to manage handover, access parameters, and/or other parameters.

Exemplary embodiments have been described above. Those skilled in the art will understand, however, that changes and modifications may be made to these embodiments without departing from the true scope and spirit of the invention.

We claim:

1. A method operable in a wireless communication system comprising a first base station configured to serve user equipment devices (UEs) over an air interface and configured to provide to the UEs a first set of operational parameters useable by the UEs to facilitate operation of the UEs in the wireless communication system, the method comprising:
   detecting, by the first base station, one or more errors in operation of the wireless communication system; and
   responsive to the detecting, automatically (i) requesting and receiving, by the first base station, from an adjacent second base station, a second set of operational parameters maintained by the second base station, and (ii) substituting, by the first base station, the second set of operational parameters for the first set of operational parameters, so that the first base station is then configured to provide to the UEs served by the first base station the second set of operational parameters rather than the first set of operational parameters,
   wherein requesting and receiving the second set of operational parameters from the second base station occurs via an inter-base-station communication interface between the first base station and the second base station.

2. The method of claim 1, wherein the first base station is a Long Term Evolution (LTE) evolved Node-B (eNodeB) of an LTE network, and wherein the LTE network is interconnected with a fallback network,
   wherein the first set of operational parameters comprises information for UEs served by the eNodeB to include in fallback-registration messages that the UEs transmit via the LTE network to the fallback network, and
   wherein the second set of operational parameters comprises a variation of the information to include in fallback-registration messages.

3. The method of claim 2, wherein the one or more errors comprises one or more instances of failed fallback-registration via the first base station.

4. The method of claim 2, wherein the first set of set of operational parameters comprises a first set of LTE System Information Block #8 (SIB8) information, and wherein the second set of operational parameters comprises a second, different set of LTE SIB8 information.

5. The method of claim 2, wherein the first set of operational parameters specifies a reference-cell-identifier for inclusion in the fallback-registration messages, and wherein the second set of operational parameters specifies a second reference-cell-identifier instead of the first reference-cell-identifier, for inclusion in the fallback-registration messages.

6. The method of claim 2, wherein the fallback network is an enhanced high rate packet data (eHRPD) network.

7. The method of claim 1,
wherein the first set of operational parameters comprises handover thresholds useable by UEs to manage handover, and
wherein the second set of operational parameters comprises a variation of at least one of the handover thresholds useable by the UEs to manage handover.

8. The method of claim 6, further comprising the first base station selecting, from a neighbor list useable to facilitate UE handover, the second base station from which to request the second set of operational parameters.

9. A base station comprising:
a wireless communication interface through which to engage in communication with user equipment devices (UEs) served by the base station;
a backhaul communication interface through which to engage in communication with various network entities; and
a controller for carrying out operations including:
(a) providing via the wireless communication interface, to UEs served by the base station, a set of operational parameters useable by the UEs to facilitate operation in a wireless communication system,
(b) determining occurrence of one or more errors in operation of the wireless communication system, and
(c) responsive to the determining, automatically (i) requesting and receiving, via the backhaul communication interface, from an adjacent base station a copy of operational parameters maintained by the adjacent base station, and (ii) substituting the received operational parameters for the set of operational parameters that the controller provides to UEs served by the base station, so that the controller thereafter instead provides to UEs served by the base station the received operational parameters to facilitate operation in the wireless communication system,
wherein the set of operational parameters comprises a reference cell identifier for circuit-switched fallback, and wherein the received operational parameters comprises a different reference cell identifier for circuit-switched fallback.

10. The base station of claim 9, wherein the set of operational parameters comprises handover thresholds useable to manage handover, and wherein the received operational parameters comprises at least one different handover threshold useable to manage handover.

11. A method operable in a wireless communication system in which a first base station is configured to serve user equipment (UEs) over an air interface, the method comprising:
periodically broadcasting by the first base station, on the air interface, a system parameter message that specifies first system parameter information, the first system parameter information being useable by the UEs to facilitate engaging in wireless communication service;
detecting by the wireless communication system one or more error conditions experienced by one or more of the UEs served by the first base station; and
responsive to the detecting, automatically obtaining, from a second base station, second system parameter information different than the first system parameter information and substituting, by the first base station, the received second system parameter information for the first system parameter information in the periodically broadcast system parameter message,
wherein the first base station has the first system parameter information stored in data storage, and wherein automatically obtaining and substituting the second system parameter information comprises (i) the first base station requesting system parameter information from the second base station, via an inter-base-station interface, (ii) responsive to the requesting, the first base station receiving the second system parameter information from the second base station via the inter-base-station interface, and (iii) the first base station storing the received second system parameter information in place of the first system parameter information,
whereby the system parameter message thereafter periodically broadcast by the first base station then specifies the second system parameter information instead of the first system parameter information.

12. The method of claim 11, wherein the first base station is a Long Term Evolution (LTE) evolved Node-B (eNodeB) of an LTE network, and wherein the LTE network is interconnected with a fallback network,
wherein the first system parameter information comprises information for UEs served by the eNodeB to include in fallback-registration messages that the UEs transmit via the LTE network to the fallback network, and
wherein the second system parameter information comprises a variation of the information to include in the fallback-registration messages.

13. The method of claim 12, wherein the system parameter message is an LTE System Information Block #8 (SIB8) message.

14. The method of claim 13, wherein the first system parameter information comprises a reference cell identifier for inclusion by the UEs in the fallback-registration messages, and wherein the second system parameter information comprises a second, different reference cell identifier instead of the first reference cell identifier, for inclusion by the UEs in the fallback-registration messages.

15. The method of claim 12, wherein the one or more error conditions comprise one or more instances of failed fallback-registration via the eNodeB.

16. The method of claim 11,
wherein the first system parameter information comprises handover thresholds useable by UEs to manage handover, and
wherein the second system parameter information comprises a variation of at least one of the handover thresholds.

17. The method of claim 11, further comprising the first base station selecting, from a neighbor list useable to facilitate UE handover, the second base station from which to request the system parameter information.

* * * * *